United States Patent
Ito et al.

(10) Patent No.: US 10,428,274 B2
(45) Date of Patent: Oct. 1, 2019

(54) LIQUID CRYSTAL ALIGNMENT AGENT FOR PHOTO-ALIGNMENT, ALIGNING MEMBER, AND RETARDATION MEMBER

(71) Applicant: Nissan Chemical Industries, Ltd., Tokyo (JP)

(72) Inventors: Jun Ito, Funabashi (JP); Yuta Kanno, Funabashi (JP); Tadashi Hatanaka, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 32 days.

(21) Appl. No.: 15/578,792

(22) PCT Filed: May 27, 2016

(86) PCT No.: PCT/JP2016/065817
§ 371 (c)(1),
(2) Date: Dec. 1, 2017

(87) PCT Pub. No.: WO2016/194846
PCT Pub. Date: Dec. 8, 2016

(65) Prior Publication Data
US 2018/0119016 A1   May 3, 2018

(30) Foreign Application Priority Data
Jun. 2, 2015  (JP) ................................ 2015-112182

(51) Int. Cl.
| | | |
|---|---|---|
| C08L 33/06 | (2006.01) | |
| C09K 19/56 | (2006.01) | |
| C08F 20/18 | (2006.01) | |
| G02F 1/13363 | (2006.01) | |
| G02F 1/1337 | (2006.01) | |
| C08F 220/30 | (2006.01) | |
| C08F 267/06 | (2006.01) | |
| G02B 27/26 | (2006.01) | |

(52) U.S. Cl.
CPC .............. *C09K 19/56* (2013.01); *C08F 20/18* (2013.01); *C08F 220/30* (2013.01); *C08F 267/06* (2013.01); *C08L 33/06* (2013.01); *G02F 1/1337* (2013.01); *G02F 1/13363* (2013.01); *G02B 27/26* (2013.01); *G02F 1/133711* (2013.01); *G02F 1/133788* (2013.01)

(58) Field of Classification Search
CPC ...... C08F 20/18; C08F 267/06; C08F 220/30; C08F 2220/303; C08L 33/06; G02F 1/13363; G02F 1/1337; G02F 1/133711; G02F 1/133788; C09K 19/56; G02B 27/26
See application file for complete search history.

(56) References Cited

U.S. PATENT DOCUMENTS

| | | | | |
|---|---|---|---|---|
| 10,081,693 B2 * | 9/2018 | Yukawa et al. | ........ | C08F 212/08 |
| 2012/0114879 A1 * | 5/2012 | Hatanaka et al. | ...... | C08L 33/08 |
| | | | | 428/1.2 |
| 2017/0184923 A1 * | 6/2017 | Omura et al. | ........... | C08K 5/06 |

FOREIGN PATENT DOCUMENTS

| | | |
|---|---|---|
| JP | H10-232365 A | 9/1998 |
| JP | 2001-517719 A | 10/2001 |
| JP | 3611342 B2 | 1/2005 |
| JP | 2005-049865 A | 2/2005 |
| JP | 2009-058584 A | 3/2009 |
| JP | 2014-126581 A | 7/2014 |
| WO | 2015/053232 A1 | 4/2015 |

(Continued)

OTHER PUBLICATIONS

Mar. 26, 2018 European Search Report issued in European Patent Application No. 16803281.1.

(Continued)

*Primary Examiner* — Nathan M Nutter
(74) *Attorney, Agent, or Firm* — Oliff PLC

(57) ABSTRACT

A liquid crystal alignment agent for photo-alignment for providing an aligning member has excellent photoreaction efficiency and is capable of aligning polymerizable liquid crystals with high sensitivity. A liquid crystal alignment agent for photo-alignment includes (A) a resin having a side chain including a structure of Formula (1) and (B) a compound of Formula (2), an alignment member obtained from the liquid crystal alignment agent, and a retardation member: wherein X1 is a benzene ring which may be arbitrarily substituted with an substituent, R is a substituent selected from OH and $NH_2$, $R^1$, $R^2$, $R^3$, $R^4$ and $R^5$ are each independently a substituent selected from a hydrogen atom, a halogen atom, $C_{1-6}$ alkyl, $C_{1-6}$ haloalkyl, etc., and n is an integer of 0 or 1.

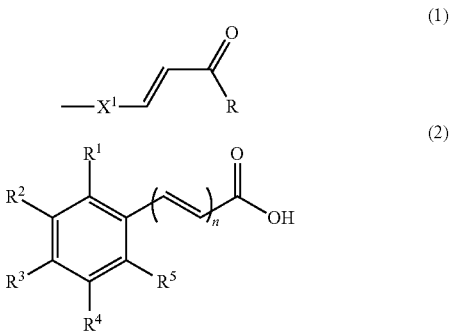

6 Claims, No Drawings

(56) References Cited

FOREIGN PATENT DOCUMENTS

WO         2016/113930  A1      7/2016
WO         2016/113931  A1      7/2016

OTHER PUBLICATIONS

Aug. 16, 2016 International Search Report issued in International Patent Application PCT/JP2016/065817.
Aug. 16, 2016 Written Opinion issued in International Application PCT/JP2016/065817.
Satoshi Minami et al; "Suiso Ketsugosei no Kobunshi Ekisho to Teibunshi Kagobutsu no Suiso Ketsugo Fukugotai Film no Hikari Haiko"; The Chemical Society of Japan Dai 95 Shunki Nenkai Koen Yokoshu, Mar. 11, 2015, vol. 95, No. 3, p. 1001 (No. 2PC-154).
Kazutoshi Miyake et al; "Kobunshi/Teibunshi Fukugo Zairyo ni yoru Kobunshi Ekisho Film no Sonoba Sakusei to Hikari Haiko"; Polymer Preprints, Japan, Sep. 3, 2014, vol. 63, No. 2, pp. 5957-5958.

* cited by examiner

LIQUID CRYSTAL ALIGNMENT AGENT FOR PHOTO-ALIGNMENT, ALIGNING MEMBER, AND RETARDATION MEMBER

TECHNICAL FIELD

The present invention relates to a liquid crystal alignment agent for photo-alignment, an aligning member, and a retardation member.

BACKGROUND ART

Recently, in the field of displays such as televisions using liquid crystal panels, 3D displays capable of providing 3D images have been developed in order to achieve high performance. In such 3D displays, a stereoscopic image can be displayed, for example, so that an image for the right eye is viewed by a viewer using the right eye, and an image for the left eye is viewed by a viewer using the left eye.

Various types of 3D displays for displaying 3D images can be used, and a lenticular lens-type, a parallax barrier-type, and the like are known as types that do not require special eyeglasses.

As one of display types in which a viewer wears eyeglasses to view 3D images, a circularly polarized light glasses-type, etc., is known (see Patent Document 1, for example).

In a circularly polarized light glasses-type 3D display, a retardation member is generally disposed on a display device for forming an image, such as a liquid crystal panel. In this retardation member, a plurality of each of two types of retardation regions having different retardation characteristics from each other are regularly arranged, thereby forming a retardation member that is patterned. Hereinafter, in the present invention, a retardation member that is patterned such that a plurality of retardation regions having different retardation characteristics are arranged therein is referred to as a patterned retardation member.

For example, as disclosed in Patent Document 2, a patterned retardation member can be fabricated by optically patterning a retardation material composed of polymerizable liquid crystals. In the optical patterning of a retardation material composed of polymerizable liquid crystals, a known photo-alignment technique for forming an aligning member for a liquid crystal panel is used. More specifically, a coating film made of a photo-aligning material is provided on a substrate, and the coating film is irradiated with two types of polarized beams having different polarization directions. A photo-alignment film is then obtained as an aligning member in which two types of liquid crystal alignment regions having different liquid crystal alignment control directions are formed. A retardation material containing polymerizable liquid crystals in a solution state is applied onto this photo-alignment film to align the polymerizable liquid crystals. Subsequently, the aligned polymerizable liquid crystals are cured to form a patterned retardation member.

An acrylic resin, a polyimide resin, or the like, which has a photodimerized moiety, such as a cinnamoyl group or a chalcone group, in a side chain, is known as a photo-aligning material that can be used in the formation of an aligning member using a photo-alignment technique for liquid crystal panels. It has been reported that these resins exhibit the ability to control alignment of liquid crystals (hereinafter also referred to as liquid crystal alignment properties) by being irradiated with polarized UV (see Patent Documents 3-5).

PRIOR-ART DOCUMENTS

Patent Documents

Patent Document 1: Japanese Patent Application Publication No. 10-232365 (JP H10-232365 A)
Patent Document 2: Japanese Patent Application Publication No. 2005-49865 (JP 2005-49865 A)
Patent Document 3: Japanese Patent No. 3611342 (JP 3611342 B2)
Patent Document 4: Japanese Patent Application Publication No. 2009-058584 (JP 2009-058584 A)
Patent Document 5: Published Japanese Translation of PCT Application No. 2001-517719 (JP 2001-517719 A)

SUMMARY OF THE INVENTION

Problems to be Solved by the Invention

However, according to studies by the present inventors, it has been found that satisfactory characteristics are not obtained when such an acrylic resin having a photodimerized moiety, such as a cinnamoyl group or a chalcone group, in a side chain is applied to the formation of a retardation member. In particular, in order to form an aligning member by irradiating these resins with polarized UV, and use the aligning member to optically pattern a retardation material composed of polymerizable liquid crystals, a large exposure dose of polarized UV is required. The exposure dose of polarized UV is significantly larger than an exposure dose of polarized UV (for example, about 30 mJ/cm$^2$) sufficient to align typical liquid crystals for liquid crystal panels.

The reason why the exposure dose of polarized UV is increased is that, when forming a retardation member, polymerizable liquid crystals—unlike liquid crystals for liquid crystal panels—are used in the form of a solution, and applied onto an aligning member.

When an acrylic resin or the like having a photodimerized moiety in a side chain, such as a cinnamoyl group, is used to form an aligning member and align polymerizable liquid crystals, photocrosslinking using a photodimerization reaction is performed on the acrylic resin or the like. Until resistance to a polymerizable liquid crystal solution is expressed, it is necessary to irradiate the acrylic resin with a large exposure dose of polarized light. Typically, aligning liquid crystals in a liquid crystal panel requires that only the surface of a photo-aligning aligning member be subjected to a dimerization reaction. However, in order to cause solvent resistance to be expressed in an aligning member by using a conventional material such as the above-mentioned acrylic resin, it is necessary to cause the reaction also in the interior of the aligning member, and thus a larger exposure dose is required. Consequently, there has been a problem in that the alignment sensitivity of a conventional material becomes extremely low.

In addition, the technique of adding a crosslinking agent in order to cause such solvent resistance to be expressed in the above-mentioned conventional material resin is known. However, it is known that, following a thermal curing reaction by using a crosslinking agent, a three-dimensional structure is formed in the coating film thus obtained, and photoreactivity is reduced. In other words, alignment sensitivity is significantly deteriorated, so that the desired effect cannot be obtained even when a crosslinking agent is added to a conventional material.

Therefore, a photo-alignment technique capable of improving the alignment sensitivity of an aligning member and reducing the exposure dose of polarized UV, and a liquid crystal alignment agent for photo-alignment used to form the aligning member are required. In addition, a technique capable of providing a patterned retardation member with high efficiency is required.

The present invention has been made based on the above findings and examination results. In other words, an object of the present invention is to provide a liquid crystal alignment agent for photo-alignment for providing an aligning member which has excellent photoreaction efficiency and is capable of aligning polymerizable liquid crystals with high sensitivity.

Another object of the present invention is to provide: an aligning member capable of enlarging the margin region, of the irradiation amount of UV radiation, in which satisfactory liquid crystal alignment properties can be achieved; and a retardation member formed using the aligning member.

Other objects and advantages of the present invention will be apparent from the description below.

Means for Solving the Problems

A first aspect of the present invention relates to a liquid crystal alignment agent for photo-alignment, the liquid crystal alignment agent containing (A) a resin having a side chain including the structure of Formula (1) below, and (B) a compound of Formula (2) below,

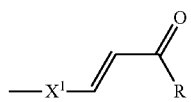
(1)

[(in Formula (1), $X^1$ is a benzene ring which may be arbitrarily substituted, and R is a substituent selected from OH and $NH_2$)]

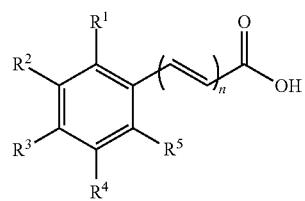
(2)

(in Formula (2), any 3-5 of $R^1$, $R^2$, $R^3$, $R^4$ and $R^5$ are each independently a substituent selected from a hydrogen atom, a halogen atom, $C_{1-6}$ alkyl, $C_{1-6}$ haloalkyl, $C_{3-8}$ cycloalkyl, $C_{3-8}$ halocycloalkyl, $C_{2-6}$ alkenyl, $C_{2-6}$ haloalkenyl, $C_{3-8}$ cycloalkenyl, $C_{3-8}$ halocycloalkenyl, $C_{2-6}$ alkynyl, $C_{2-6}$ haloalkynyl, $C_{1-6}$ alkoxy, $C_{1-6}$ haloalkoxy, ($C_{1-6}$ alkyl)carbonyl, ($C_{1-6}$ haloalkyl)carbonyl, ($C_{1-6}$ alkoxy)carbonyl, ($C_{1-6}$ haloalkoxy)carbonyl, ($C_{1-6}$ alkyl)aminocarbonyl, ($C_{1-6}$ haloalkyl)aminocarbonyl, di($C_{1-6}$ alkyl)aminocarbonyl, cyano and nitro, and when any 3 or 4 of $R^1$, $R^2$, $R^3$, $R^4$ and $R^5$ are as defined above, the remaining one or two of $R^1$, $R^2$, $R^3$, $R^4$ and $R^5$ is/are a group of Formula (3) below,

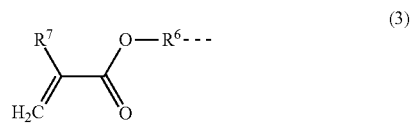
(3)

(in Formula (3), the dashed line is a bond, $R^6$ is $C_{1-30}$ alkylene, phenylene, or a divalent carbocyclic ring or heterocyclic ring, one or a plurality of hydrogen atoms of the alkylene, phenylene, or divalent carbocyclic ring or heterocyclic ring is optionally substituted with a fluorine atom or an organic group, and when $R^6$ is $C_{1-30}$ alkylene, $-CH_2CH_2-$ of $R^6$ is optionally replaced by $-CH=CH-$, $-CH_2-$ of $R^6$ replaced by phenylene or a divalent carbocyclic ring or heterocyclic ring, and may be replaced by $-O-$, $-NHCO-$, $-CONH-$, $-COO-$, $-OCO-$, $-NH-$, $-NHCONH-$, or $-CO-$, provided these groups are not adjacent to each other, and $R^7$ is a hydrogen atom or a methyl group), and n is an integer of 0 or 1)].

In the first aspect of the present invention, the resin of component (A) is preferably an acrylic copolymer.

In the first aspect of the present invention, the R in Formula (1) is preferably OH.

In the first aspect of the present invention, the content of component (B) is preferably 3-100 parts by mass with respect to 100 parts by mass of component (A).

A second aspect of the present invention relates to an aligning member prepared by using the liquid crystal alignment agent for photo-alignment according to the first aspect of the present invention.

A third aspect of the present invention relates to a retardation member prepared by using the aligning member obtained from the liquid crystal alignment agent for photo-alignment according to the first aspect of the present invention.

Effects of the Invention

According to the first aspect of the present invention, a liquid crystal alignment agent for photo-alignment may be provided, the liquid crystal alignment agent being capable of forming a cured film which has a photoirradiation-induced liquid crystal-alignment ability (photo-alignment properties), as well as high transparency, high solvent resistance, and high heat resistance.

According to the second aspect of the present invention, an aligning member may be provided, the aligning member having excellent adhesion, alignment sensitivity, and pattern formability, and being capable of aligning polymerizable liquid crystals with high sensitivity and thus enlarging the margin region, of the irradiation amount of UV radiation, in which satisfactory liquid crystal alignment properties can be achieved.

According to the third aspect of the present invention, a retardation member, which can be formed with high efficiency even on a resin film and thus optically patterned, is provided.

MODES FOR CARRYING OUT THE INVENTION

<Liquid Crystal Alignment Agent for Photo-Alignment>

The liquid crystal alignment agent for photo-alignment according to the present invention is for forming a cured film having photo-alignment properties, and contains: a resin having a specific photo-aligning moiety; and a cinnamic acid derivative. The liquid crystal alignment agent for photo-alignment according to the present invention may also contain other additives in addition to components (A) and (B), provided the effect of the present invention is not impaired. Details of each component will be described below.

<Component (A)>

(A) is a resin having a side chain including the structure of Formula (1) below,

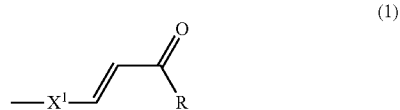

(wherein $X^1$ is a benzene ring which may be arbitrarily substituted, and R is a substituent selected from OH and $NH_2$).

Examples of the arbitrary substituent may include, but are not limited to, an alkyl group such as a methyl group, an ethyl group, a propyl group, a butyl group, or an isobutyl group; a haloalkyl group such as a trifluoromethyl group; an alkoxy group such as a methoxy group or an ethoxy group; a halogen atom such as an iodine atom, a bromine atom, a chlorine atom, or a fluorine atom; a cyano group; a nitro group, and the like.

In the case in which a benzene ring may be substituted with a substituent, examples of the substituent may include, but are not limited to, an alkyl group such as a methyl group, an ethyl group, a propyl group, a butyl group, or an isobutyl group; a haloalkyl group such as a trifluoromethyl group; an alkoxy group such as a methoxy group or an ethoxy group; a halogen atom such as an iodine atom, a bromine atom, a chlorine atom, or a fluorine atom; a cyano group; a nitro group, and the like.

The resin of component (A) is preferably an acrylic copolymer.

As the R, an OH group is particularly preferred.

As component (A), a resin in which an organic group including the structure of Formula (1) is bonded to a backbone by a spacer is preferred. The spacer is a divalent group selected from a linear alkylene group having a carbon atom number of 1 to 15, a branched alkylene group having a carbon atom number of 3 to 20, cyclic alkylene group having a carbon atom number of 3 to 20 and phenylene group; or a group formed by bonding a plurality of the divalent groups. In this case, bonds between divalent groups constituting the spacer, bonds between the spacer and a polymerizable group, and bonds between the spacer and a group of Formula (1) may be single bonds, ester bonds, amide bonds, urea bonds, or ether bonds. When there are a plurality of the divalent groups, the divalent groups may be identical to or different from each other, and when there is a plurality of the bonds, the bonds may be identical to or different from each other.

Examples of the linear alkylene group having a carbon atom number of 1 to 15 may include a methylene group, an ethylene group, an n-propylene group, an n-butylene group, an n-pentylene group, an n-hexylene group, an n-heptylene group, an n-octylene group, an n-nonylene group, an n-decylene group, an n-undecylene group, an n-dodecylene group, an n-tridecylene group, an n-tetradecylene group, and an n-pentadecylene group.

Examples of the branched alkylene group having a carbon atom number of 3 to 20 may include an i-propylene group, an i-butylene group, an s-butylene group, a t-butylene group, a 1-methyl-n-butylene group, a 2-methyl-n-butylene group, a 3-methyl-n-butylene group, a 1,1-dimethyl-n-propylene group, a 1,2-dimethyl-n-propylene group, a 2,2-dimethyl-n-propylene group, a 1-ethyl-n-propylene group, a 1-methyl-n-pentylene group, a 2-methyl-n-pentylene group, a 3-methyl-n-pentylene group, a 4-methyl-n-pentylene group, a 1,1-dimethyl-n-butylene group, a 1,2-dimethyl-n-butylene group, a 1,3-dimethyl-n-butylene group, a 2,2-dimethyl-n-butylene group, a 2,3-dimethyl-n-butylene group, a 3,3-dimethyl-n-butylene group, a 1-ethyl-n-butylene group, a 2-ethyl-n-butylene group, a 1,1,2-trimethyl-n-propylene group, a 1,2,2-trimethyl-n-propylene group, a 1-ethyl-1-methyl-n-propylene group, a 1-ethyl-2-methyl-n-propylene group, and the like, as well as an alkylene group which has a carbon atom number up to 20 and is branched at an arbitrary position.

Examples of the cyclic alkylene group having a carbon atom number of 3 to 20 may include a monocyclic alkylene group such as a cyclopropylene group, a cyclobutylene group, a cyclopentylene group, a cyclohexylene group, a cycloheptylene group and a cyclooctylene group; and a polycyclic alkylene group such as a norbornylene group, a tricyclodecylene group, a tetracyclododecylene group and an adamantylene group.

Among these, component (A) is preferably a resin having a photo-aligning group in which R in Formula (1) is a hydroxy group or an amino group and $X^1$ in Formula (1) is a phenylene group that may be substituted with an arbitrary substituent, and more preferably, component (A) is an acrylic copolymer having the photo-aligning group.

In the present invention, the acrylic copolymer refers to a polymer obtained via homopolymerization or copolymerization using a monomer having an unsaturated double bond, such as acrylic acid ester, methacrylic acid ester, or styrene. Thus, the "acrylic copolymer" in the present invention includes an acrylic polymer in addition to the acrylic copolymer.

The acrylic copolymer having a photo-aligning group (hereinafter, also referred to as a specific copolymer) may be an acrylic copolymer having such a structure, and the backbone skeletons, the types of side chains, and the like in polymers constituting the acrylic copolymer are not particularly limited.

The acrylic copolymer of component (A) has a weight average molecular weight of preferably 1,000 to 200,000, more preferably 2,000 to 150,000, and still more preferably 3,000 to 100,000. An excessively high weight average molecular weight exceeding 200,000 may reduce solubility in solvents, and thus deteriorate handling properties, and an excessively low weight average molecular weight below 1,000 may cause insufficient curing to occur when heat curing is performed, and thus decrease solvent resistance and heat resistance. The weight average molecular weight herein is a value obtained by gel permeation chromatography (GPC) using polystyrene as a standard sample.

Polymerizing a monomer having a photo-aligning group, such as a monomer having a photo-aligning group of Formula (1), is a simple method for synthesizing the acrylic copolymer of component (A) having a photo-aligning group.

Examples of a monomer having a photo-aligning group of Formula (1) may include monomers selected from Formulae M1-1 to M1-7 and M1-17 to M1-20 below, M1-1
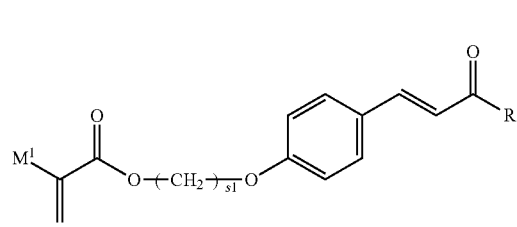
M1-2
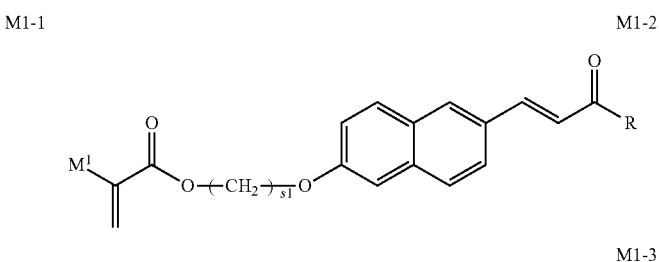
M1-3
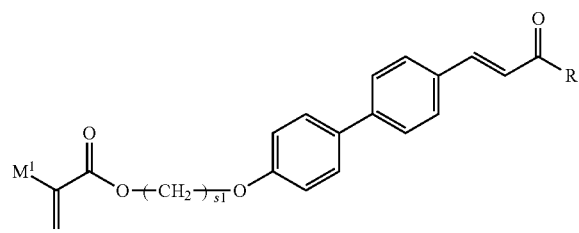
M1-4
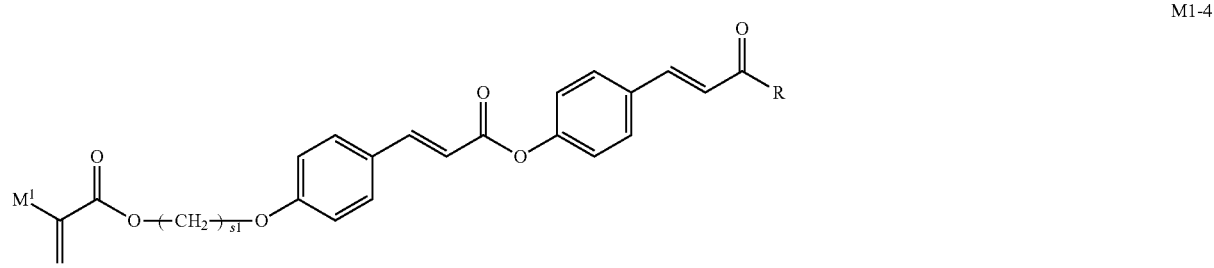
M1-5                                    M1-6
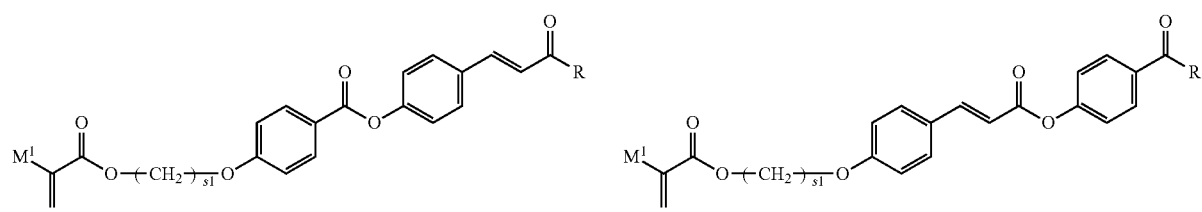
M1-7                                    M1-17
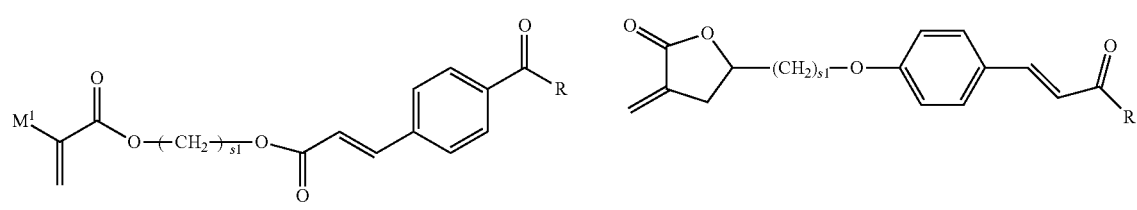
M1-18                                   M1-19
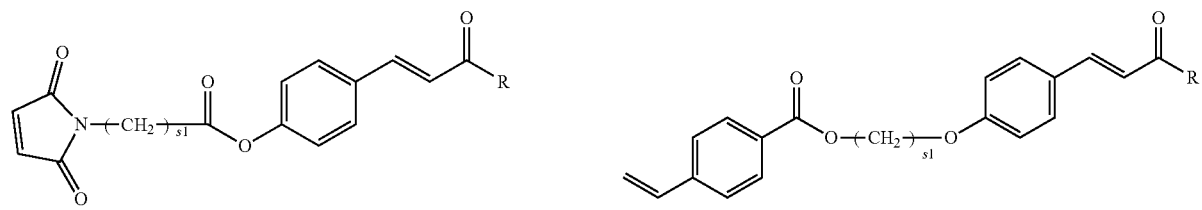
M1-20
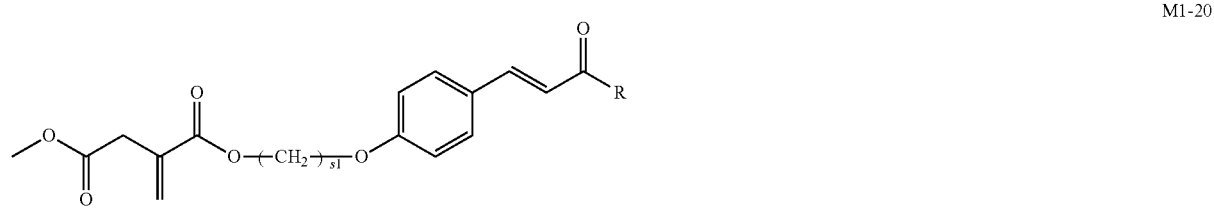

(wherein R is OH or NH$_2$, M1 is a hydrogen atom or a methyl group, and s1 is the number of methylene groups and is a natural number from 2 to 9).

Examples of a monomer having a photo-aligning group of Formula (1) may include those in which R in Formula (1) is OH, such as a 4-(6-methacryloxyhexyl-1-oxy) cinnamic acid, a 4-(6-acryloxyhexyl-1-oxy) cinnamic acid, a 4-(3-methacryloxypropyl-1-oxy) cinnamic acid, or a 4-(4-(6-methacryloxyhexyl-1-oxy)benzoyloxy) cinnamic acid; and those in which R in Formula (1) is NH$_2$, such as a 4-(6-methacryloxyhexyl-1-oxy) cinnamamide, a 4-(6-acryloxy-hexyl-1-oxy) cinnamamide, or a 4-(3-methacryloxypropyl-1-oxy) cinnamamide, etc.

In the present invention, in addition to monomers having a photo-aligning group, other monomers that are copolymerizable with these monomers may be used for obtaining the specific copolymer.

Specific examples of such a monomer may include an acrylic acid ester compound, a methacrylic acid ester compound, a maleimide compound, an acrylamide compound, acrylonitrile, a maleic anhydride, a styrene compound, a vinyl compound, a monomer having a liquid crystalline side chain, a monomer having a self-crosslinking group and a crosslinking group, and a monomer having a substituent selected from a hydroxy group, an amide group, and an amino group, etc.

Specific examples of the monomers are listed below, but the present invention is not limited thereto.

Examples of the acrylic acid ester compound may include methyl acrylate, ethyl acrylate, isopropyl acrylate, benzyl acrylate, naphthyl acrylate, anthryl acrylate, anthryl methyl acrylate, phenyl acrylate, 2,2,2-trifluoroethyl acrylate, tert-butyl acrylate, cyclohexyl acrylate, isobornyl acrylate, 2-methoxyethyl acrylate, methoxytriethylene glycol acrylate, 2-ethoxyethyl acrylate, tetrahydrofurfuryl acrylate, 3-methoxybutyl acrylate, dicyclopentanyl acrylate, 2-methyl-2-adamantyl acrylate, 2-propyl-2-adamantyl acrylate, 8-methyl-8-tricyclodecyl acrylate, 8-ethyl-8-tricyclodecyl acrylate, and the like.

Examples of the methacrylic acid ester compound may include methyl methacrylate, ethyl methacrylate, isopropyl methacrylate, benzyl methacrylate, naphthyl methacrylate, anthryl methacrylate, anthryl methyl methacrylate, phenyl methacrylate, 2,2,2-trifluoroethyl methacrylate, tert-butyl methacrylate, cyclohexyl methacrylate, isobornyl methacrylate, 2-methoxyethyl methacrylate, methoxytriethylene glycol methacrylate, 2-ethoxyethyl methacrylate, tetrahydrofurfuryl methacrylate, 3-methoxybutyl methacrylate, dicyclopentanyl methacrylate, 2-methyl-2-adamantyl methacrylate, γ-butyrolactone methacrylate, 2-propyl-2-adamantyl methacrylate, 8-methyl-8-tricyclodecyl methacrylate, 8-ethyl-8-tricyclodecyl methacrylate, and the like.

Examples of the vinyl compound may include methyl vinyl ether, benzyl vinyl ether, vinyl naphthalene, vinyl carbazole, allyl glycidyl ether, 3-ethenyl-7-oxabicyclo[4.1.0]heptane, and the like.

Examples of the styrene compound may include styrene, methylstyrene, chlorostyrene, bromostyrene, and the like.

Examples of the maleimide compound may include maleimide, N-methyl maleimide, N-phenyl maleimide, N-cyclohexyl maleimide, and the like.

A monomer of a formula selected from the group consisting of Formulae M2-1 to M2-9 below may be used as a monomer having a carboxyl group,

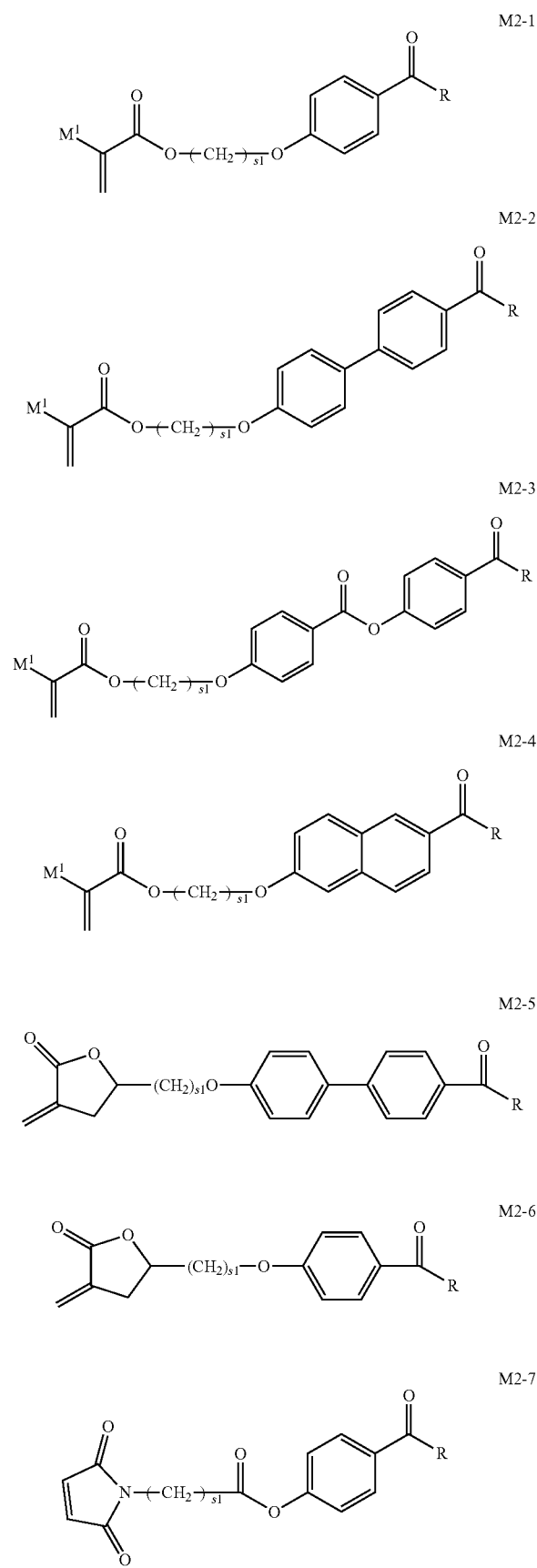

M2-8

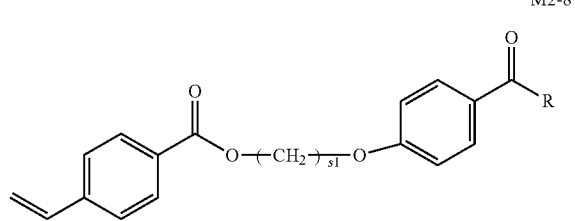

M2-9

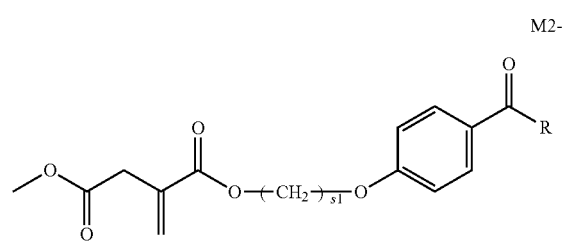

(wherein R is OH or NH$_2$, M1 is a hydrogen atom or a methyl group, and s1 is the number of methylene groups and is a natural number from 2 to 9).

As one example of the other monomers, a monomer of a formula selected from the group consisting of Formulae M2-10 to M2-16 below may be used as a monomer having a substituent expressing liquid crystallinity,

M2-10

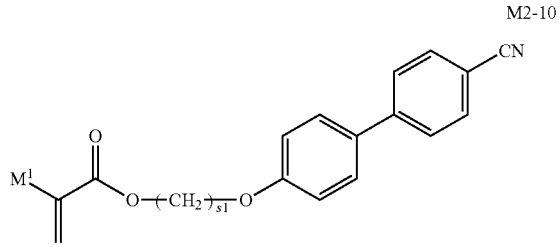

M2-11

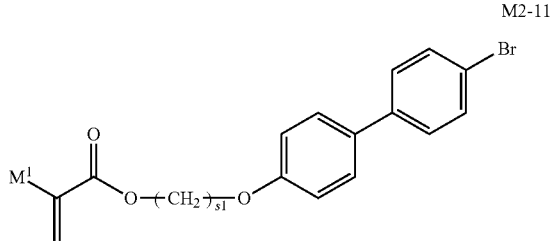

M2-12

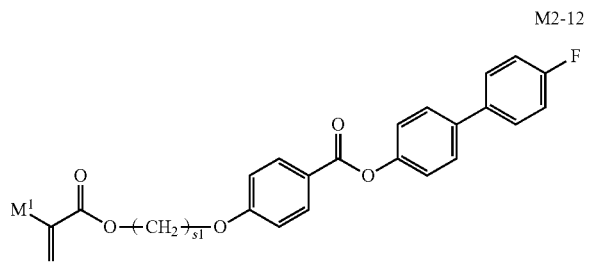

M2-13

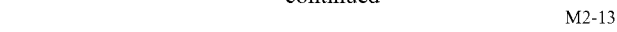

M2-14

M2-15

M2-16

(wherein M1 is a hydrogen atom or a methyl group, and s1 is the number of methylene groups and is a natural number from 2 to 9).

Examples of the monomer having a self-crosslinking group and a crosslinking group may include a (meth) acrylamide compound which is substituted with a hydroxymethyl group or an alkoxymethyl group, such as N-hydroxymethyl(meth)acrylamide, N-methoxymethyl (meth)acrylamide, N-ethoxymethyl(meth)acrylamide, or N-butoxymethyl(meth)acrylamide; a monomer having a tri-alkoxysilyl group, such as 3-trimethoxysilylpropyl acrylate, 3-triethoxysilylpropyl acrylate, 3-trimethoxysilylpropyl methacrylate, or 3-triethoxysilylpropyl methacrylate; a monomer having a glycidyl group, such as glycidyl acrylate or glycidyl methacrylate; a monomer having a vinyl group, such as 1,2-epoxy-5-hexene or 1,7-octadiene monoepoxide; and a monomer having a blocked isocyanate group, such as methacrylic acid 2-(0-(1'-methylpropylideneamino)car-boxyamino)ethyl or methacrylic acid 2-(3,5-dimethylpyra-zolyl)carbonylamino)ethyl, etc. The term (meth)acrylamide indicates both acrylamide and methacrylamide.

Examples of a monomer having at least one group selected from the group consisting of a hydroxy group, an amide group and an amino group may include a monomer having a hydroxy group, such as 2-hydroxyethyl acrylate, 2-hydroxyethyl methacrylate, 2-hydroxypropyl acrylate, 2-hydroxypropyl methacrylate, 4-hydroxybutyl acrylate, 4-hydroxybutyl methacrylate, 2,3-dihydroxypropyl acrylate, 2,3-dihydroxypropyl methacrylate, diethylene glycol monoacrylate, diethylene glycol monomethacrylate, caprolactone 2-(acryloyloxy)ethyl ester, caprolactone 2-(methacryloyloxy) ethyl ester, poly (ethylene glycol)ethyl ether acrylate, poly (ethylene glycol)ethyl ether methacrylate, 5-acryloyloxy-6-hydroxynorborene-2-carboxylic-6-lactone, and 5-methacryloyloxy-6-hydroxynorbornene-2-carboxylic-6-lactone; a monomer having a phenolic hydroxy group, such as hydroxystyrene, N-(hydroxyphenyl)methacrylamide, N-(hydroxyphenyl)acrylamide, N-(hydroxyphenyl)maleimide, and N-(hydroxyphenyl)maleimide; a monomer having an amide group, such as acrylamide and methacrylamide; and a monomer having an amino group, such as aminoethyl acrylate, aminoethyl methacrylate, aminopropyl acrylate, and aminopropyl methacrylate, etc.

The amount of each monomer used to obtain the specific copolymer is, on the basis of the total amount of all of the monomers, preferably 10-90 mol % of a monomer having a photo-aligning group of Formula (1) and 10-90 mol % of the other monomers.

Although the method for obtaining the specific copolymer used in the present invention is not particularly limited, the specific copolymer is obtained by a polymerization reaction carried out at a temperature of 50-110° C. in a solvent in which a monomer having a photo-aligning group of Formula (1) coexists, if desired, with other monomers and a polymerization initiator, etc. The solvent used herein is not limited, provided the solvent can dissolve a monomer having a photo-aligning group of Formula (1), other monomers that are used if desired, and a polymerization initiator, etc. Specific examples thereof will be described in the <Solvent> section described below.

The specific copolymer obtained by the method described above is generally in a solution state, that is, dissolved in a solvent.

A solution of the specific copolymer obtained by the method described above may be added to diethyl ether, water, or the like with stirring to re-precipitate the specific copolymer, and the resultant precipitate may be filtered, washed, and then dried at room temperature or heat-dried under atmospheric pressure or reduced pressure to thereby prepare a powder of the specific copolymer. By this operation, the polymerization initiator and unreacted monomers, which coexist with the specific copolymer, can be removed, and consequently, a purified powder of the specific copolymer is obtained. When the specific copolymer cannot be sufficiently purified in a single operation, the obtained powder may be re-dissolved in a solvent to repeat the operation.

In the present invention, the specific copolymer may be used in the form of powder, or in the form of a solution in which purified powder is re-dissolved in a solvent described below.

In the present invention, the specific copolymer of component (A) may be a mixture of multiple types of the specific copolymer.

<Component (B)>

The liquid crystal alignment agent for photo-alignment according to the present invention contains, as component (B), a compound of Formula (2),

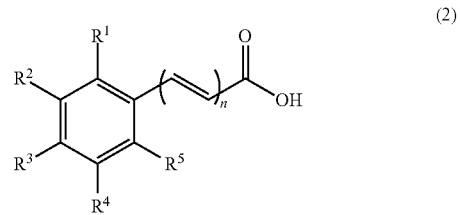

(wherein any 3-5 of $R^1$, $R^2$, $R^3$, $R^4$ and $R^5$ are each independently a substituent selected from a hydrogen atom, a halogen atom, $C_{1-6}$ alkyl, $C_{1-6}$ haloalkyl, $C_{3-8}$ cycloalkyl, $C_{3-8}$ halocycloalkyl, $C_{2-6}$ alkenyl, $C_{2-6}$ haloalkenyl, $C_{3-8}$ cycloalkenyl, $C_{3-8}$ halocycloalkenyl, $C_{2-6}$ alkynyl, $C_{2-6}$ haloalkynyl, $C_{1-6}$ alkoxy, $C_{1-6}$ haloalkoxy, ($C_{1-6}$ alkyl)carbonyl, ($C_{1-6}$ haloalkyl)carbonyl, ($C_{1-6}$ alkoxy)carbonyl, ($C_{1-6}$ haloalkoxy)carbonyl, ($C_{1-6}$ alkylamino)carbonyl, ($C_{1-6}$ haloalkyl)aminocarbonyl, di($C_{1-6}$ alkyl)aminocarbonyl, cyano and nitro, and when any 3 or 4 of $R^1$, $R^2$, $R^3$, $R^4$ and $R^5$ are as defined above, the remaining one or two of $R^1$, $R^2$, $R^3$, $R^4$ and $R^5$ is/are a group of Formula (3) below,

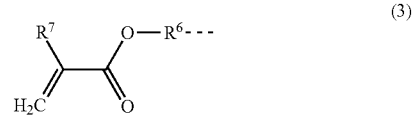

(in Formula (3), the dashed line is a bond, $R^6$ is $C_{1-30}$ alkylene, phenylene, or a divalent carbocyclic ring or heterocyclic ring, one or a plurality of hydrogen atoms of the alkylene, phenylene, or divalent carbocyclic ring or heterocyclic ring may be substituted with a fluorine atom or an organic group, and when $R^6$ is $C_{1-30}$ alkylene, —$CH_2CH_2$— of $R^6$ may be replaced by —CH=CH—, —$CH_2$— of $R^6$ may be replaced by phenylene or a divalent carbocyclic ring or heterocyclic ring, and may be replaced by —O—, —NHCO—, —CONH—, —COO—, —OCO—, —NH—, —NHCONH—, or —CO—, provided these groups are not adjacent to each other, and $R^7$ is a hydrogen atom or a methyl group), and n is an integer of 0 or 1).

Examples of the halogen atom herein may include a fluorine atom, a chlorine atom, a bromine atom, and an iodine atom. The notation "halo" herein is also these halogen atoms.

The notation "$C_{a-b}$ alkyl" herein is a linear or branched hydrocarbon group having a carbon atom number of a to b. Specific examples of the $C_{a-b}$ alkyl may include a methyl group, an ethyl group, an n-propyl group, an i-propyl group, an n-butyl group, an i-butyl group, an s-butyl group, a t-butyl group, an n-pentyl group, a 1-methylbutyl group, a 2-methylbutyl group, a 3-methylbutyl group, a 1-ethylpropyl group, a 1,1-dimethylpropyl group, a 1,2-dimethylpropyl group, a 2,2-dimethylpropyl group, an n-hexyl group, a 1-methylpentyl group, a 2-methylpentyl group, a 1,1-dimethylbutyl group, a 1,3-dimethylbutyl group, a heptyl group, an octyl group, a nonyl group, a decyl group, an undecyl group, a dodecyl group, and the like, which are selected within the range of the individual specified number of carbon atoms.

The notation "$C_{a-b}$ haloalkyl" herein is a linear or branched hydrocarbon group which has a carbon atom number of a to b and in which a hydrogen atom bonded to a carbon atom is arbitrarily substituted with a halogen atom.

When two or more halogen atoms substitute hydrogen atoms, these halogen atoms may be identical to or different from each other. Specific examples of the $C_{a-b}$ haloalkyl may include a fluoromethyl group, a chloromethyl group, a bromomethyl group, a iodomethyl group, a difluoromethyl group, a chlorofluoromethyl group, a dichloromethyl group, a bromofluoromethyl group, a trifluoromethyl group, a chlorodifluoromethyl group, a dichlorofluoromethyl group, a trichloromethyl group, a bromodifluoromethyl group, a bromochlorofluoromethyl group, a dibromofluoromethyl group, a 2-fluoroethyl group, a 2-chloroethyl group, a 2-bromoethyl group, a 2,2-difluoroethyl group, a 2-chloro-2-fluoroethyl group, a 2,2-dichloroethyl group, a 2-bromo-2-fluoroethyl group, a 2,2,2-trifluoroethyl group, a 2-chloro-2,2-difluoroethyl group, a 2,2-dichloro-2-fluoroethyl group, a 2,2,2-trichloroethyl group, a 2-bromo-2,2-difluoroethyl group, a 2-bromo-2-chloro-2-fluoroethyl group, a 2-bromo-2,2-dichloroethyl group, a 1,1,2,2-tetrafluoroethyl group, a pentafluoroethyl group, a 1-chloro-1,2,2,2-tetrafluoroethyl group, a 2-chloro-1,1,2,2-tetrafluoroethyl group, a 1,2-dichloro-1,2,2-trifluoroethyl group, a 2-bromo-1,1,2,2-tetrafluoroethyl group, a 2-fluoropropyl group, a 2-chloropropyl group, a 2-bromopropyl group, a 2-chloro-2-fluoropropyl group, a 2,3-dichloropropyl group, a 2-bromo-3-fluoropropyl group, a 3-bromo-2-chloropropyl group, a 2,3-dibromopropyl group, a 3,3,3-trifluoropropyl group, a 3-bromo-3,3-difluoropropyl group, a 2,2,3,3-tetrafluoropropyl group, a 2-chloro-3,3,3-trifluoropropyl group, a 2,2,3,3,3-pentafluoropropyl group, a 1,1,2,3,3,3-hexafluoropropyl group, a heptafluoropropyl group, a 2,3-dichloro-1,1,2,3,3-pentafluoropropyl group, a 2-fluoro-1-methylethyl group, a 2-chloro-1-methylethyl group, a 2-bromo-1-methylethyl group, a 2,2,2-trifluoro-1-(trifluoromethyl)ethyl group, a 1,2,2-tetrafluoro-1-(trifluoromethyl)ethyl group, a 2,2,3,3,4,4-hexafluorobutyl group, a 2,2,3,4,4,4-hexafluorobutyl group, a 2,2,3,3,4,4,4-heptafluorobutyl group, a 1,1,2,2,3,3,4,4-octafluorobutyl group, a nonafluorobutyl group, a 4-chloro-1,1,2,2,3,3,4,4-octafluorobutyl group, a 2-fluoro-2-methylpropyl group, a 2-chloro-1,1-dimethylethyl group, a 2-bromo-1,1-dimethylethyl group, a 5-chloro-2,2,3,4,4,5,5-heptafluoropentyl group, a tridecafluorohexyl group, and the like, which are selected within the range of the individual specified number of carbon atoms.

The notation "$C_{a-b}$ cycloalkyl" herein is a cyclic hydrocarbon group having a carbon atom number of a to b, and the $C_{a-b}$ cycloalkyl may form a 3- to 6-membered single ring or complex ring structure. Each ring may be arbitrarily substituted with an alkyl group within the range of the specified number of carbon atoms. Specific examples of the $C_{a-b}$ cycloalkyl may include a cyclopropyl group, a 1-methylcyclopropyl group, a 2-methylcyclopropyl group, a 2,2-dimethylcyclopropyl group, a 2,2,3,3-tetramethylcyclopropyl group, a cyclobutyl group, a cyclopentyl group, a 2-methylcyclopentyl group, a 3-methylcyclopentyl group, a cyclohexyl group, a 2-methylcyclohexyl group, a 3-methylcyclohexyl group, a 4-methylcyclohexyl group, a bicyclo[2.2.1]heptane-2-yl group, and the like, which are selected within the range of the individual specified number of carbon atoms.

The notation "$C_{a-b}$ halocycloalkyl" herein is a cyclic hydrocarbon group which has a carbon atom number of a to b, and in which a hydrogen atom bonded to a carbon atom is arbitrarily substituted with a halogen atom, and the $C_{a-b}$ halocycloalkyl may form a 3- to 6-membered single ring or complex ring structure. Each ring may be arbitrarily substituted with an alkyl group within the range of the specified number of carbon atoms, the substitution with a halogen atom may occur in either a ring structure or side chain, or both. When two or more halogen atoms substitute hydrogen atoms, these halogen atoms may be identical to or different from each other. Specific examples of the C halocycloalkyl may include a 2,2-difluorocyclopropyl group, a 2,2-dichlorocyclopropyl group, a 2,2-dibromocyclopropyl group, a 2,2-difluoro-1-methylcyclopropyl group, a 2,2-dichloro-1-methylcyclopropyl group, a 2,2-dibromo-1-methylcyclopropyl group, a 2,2,3,3-tetrafluorocyclobutyl group, a 2-(trifluoromethyl)cyclohexyl group, a 3-(trifluoromethyl)cyclohexyl group, a 4-(trifluoromethyl)cyclohexyl group, and the like, which are selected within the range of the individual specified number of carbon atoms.

The notation "$C_{a-b}$ alkenyl" herein is an unsaturated linear or branched hydrocarbon group which has a carbon atom number of a to b and has one or two or more double bond(s) in the molecule. Specific examples of the $C_{a-b}$ alkenyl may include a vinyl group, a 1-propenyl group, a 2-propenyl group, a 1-methylethenyl group, a 2-butenyl group, a 1-methyl-2-propenyl group, a 2-methyl-2-propenyl group, a 2-pentenyl group, a 2-methyl-2-butenyl group, a 3-methyl-2-butenyl group, a 2-ethyl-2-propenyl group, a 1,1-dimethyl-2-propenyl group, a 2-hexenyl group, a 2-methyl-2-pentenyl group, a 2,4-dimethyl-2,6-heptadienyl group, a 3,7-dimethyl-2,6-octadienyl group, and the like, which are selected within the range of the individual specified number of carbon atoms.

The notation "$C_{a-b}$ haloalkenyl" herein is an unsaturated linear or branched hydrocarbon group in which a hydrogen atom bonded to a carbon atom is arbitrarily substituted with a halogen atom, and which has a carbon atom number of a to b and has one or two or more double bond(s) in the molecule. When two or more halogen atoms substitute for hydrogen atoms, these halogen atoms may be identical to or different from each other. Specific examples of $C_{a-b}$ haloalkenyl group may include a 2,2-dichlorovinyl group, a 2-fluoro-2-propenyl group, a 2-chloro-2-propenyl group, a 3-chloro-2-propenyl group, a 2-bromo-2-propenyl group, a 3-bromo-2-propenyl group, a 3,3-difluoro-2-propenyl group, a 2,3-dichloro-2-propenyl group, a 3,3-dichloro-2-propenyl group, a 2,3-dibromo-2-propenyl group, a 2,3,3-trifluoro-2-propenyl group, a 2,3,3-trichloro-2-propenyl group, a 1-(trifluoromethyl)ethenyl group, a 3-chloro-2-butenyl group, a 3-bromo-2-butenyl group, a 4,4-difluoro-3-butenyl group, a 3,4,4-trifluoro-3-butenyl group, a 3-chloro-4,4,4-trifluoro-2-butenyl group, a 3-bromo-2-methyl-2-propenyl group, and the like, which are selected within the range of the individual specified number of carbon atoms.

The notation "$C_{a-b}$ cycloalkenyl" herein is an unsaturated cyclic hydrocarbon group which has a carbon atom number of a to b and has one or two or more double bond(s), and the $C_{a-b}$ cycloalkenyl may form a 3- to 6-membered single ring or complex ring structure. Each ring may be arbitrarily substituted with an alkyl group within the range of the specified number of carbon atoms, and the double bond may be in either endo- or exo-form. Specific examples of the $C_{a-b}$ cycloalkenyl may include a 2-cyclopenten-1-yl group, 3-cyclopenten-1-yl group, 2-cyclohexen-1-yl group, 3-cyclohexen-1-yl group, a bicyclo[2.2.1]-5-hepten-2-yl group, and the like, which are selected within the range of the individual specified number of carbon atoms.

The notation "$C_{a-b}$ halocycloalkenyl" herein is an unsaturated cyclic hydrocarbon group in which a hydrogen atom bonded to a carbon atom is arbitrarily substituted with a halogen atom, and which has a carbon atom number of a to b and has one or two or more double bond(s), and the $C_{a-b}$ halocycloalkenyl may form a 3- to 6-membered single ring or complex ring structure. Each ring may be arbitrarily substituted with an alkyl group within the range of the specified number of carbon atoms, and the double bond may be in either endo- or exo-form. The substitution with a halogen atom may occur in either a ring structure or side chain, or both, and when two or more halogen atoms substitute for hydrogen atoms, these halogen atoms may be identical to or different from each other. Specific examples of the $C_{a-b}$ halocycloalkenyl may include a 2-chlorobicyclo[2.2.1]-5-hepten-2-yl group and the like, which are selected within the range of the individual specified number of carbon atoms.

The notation of $C_{a-b}$ alkynyl herein is an unsaturated linear or branched hydrocarbon group which has a carbon atom number of a to b and has one or two or more triple bond(s) in the molecule. Specific examples of the $C_{a-b}$ alkenyl may include an ethynyl group, a 1-propynyl group, a 2-propynyl group, a 2-butynyl group, a 1-methyl-2-propynyl group, a 2-pentynyl group, a 1-methyl-2-butynyl group, a 1,1-dimethyl-2-propynyl group, a 2-hexynyl group, and the like, which are selected within the range of the individual specified number of carbon atoms.

The notation "$C_{a-b}$ haloalkynyl" herein is an unsaturated linear or branched hydrocarbon group in which a hydrogen atom bonded to a carbon atom is arbitrarily substituted with a halogen atom, and which has a carbon atom number of a to b and has one or two or more triple bond(s) in the molecule. When two or more halogen atoms substitute for hydrogen atoms, these halogen atoms may be identical to or different from each other. Specific examples of the $C_{a-b}$ haloalkynyl may include a 2-chloroethynyl group, a 2-bromoethynyl group, a 2-iodoethynyl group, a 3-chloro-2-propynyl group, a 3-bromo-2-propynyl group, a 3-iodo-2-propynyl group, and the like, which are selected within the range of the individual specified number of carbon atoms.

The notation "$C_{a-b}$ alkoxy" herein is an alkyl-O— group as defined above having a carbon atom number of a to b. Specific examples of the $C_{a-b}$ alkoxy may include a methoxy group, an ethoxy group, an n-propyloxy group, an i-propyloxy group, an n-butyloxy group, an i-butyloxy group, an s-butyloxy group, a t-butyloxy group, an n-pentyloxy group, an n-hexyloxy group, and the like, which are selected within the range of the individual specified number of carbon atoms.

The notation "$C_{a-b}$ haloalkoxy" herein is an haloalkyl-O— group as defined above having a carbon atom number of a to b. Specific examples of the $C_{a-b}$ haloalkoxy may include a difluoromethoxy group, a trifluoromethoxy group, a chlorodifluoromethoxy group, a bromodifluoromethoxy group, a 2-fluoroethoxy group, a 2-chloroethoxy group, a 2,2,2-trifluoroethoxy group, a 1,1,2,2-tetrafluoroethoxy group, a 2-chloro-1,1,2-trifluoroethoxy group, a 2-bromo-1,1,2-trifluoroethoxy group, a pentafluoroethoxy group, a 2,2-dichloro-1,1,2-trifluoroethoxy group, a 2,2,2-trichloro-1,1-difluoroethoxy group, a 2-bromo-1,1,2,2-tetrafluoroethoxy group, a 2,2,3,3-tetrafluoropropyloxy group, a 1,1,2,3,3,3-hexafluoropropyloxy group, a 2,2,2-trifluoro-1-(trifluoromethyl)ethoxy group, a heptafluoropropyl group, a 2-bromo-1,1,2,3,3,3-hexafluoropropyloxy group, and the like, which are selected within the range of the individual specified number of carbon atoms.

The notation "$C_b$ alkyl)carbonyl" herein is an alkyl-C(O)— group as defined above having a carbon atom number of a to b. Specific examples of the ($C_{a-b}$ alkyl)carbonyl may include an acetyl group, a propionyl group, a butyryl group, an isobutyryl group, a valeryl group, an isovaleryl group, a 2-methylbutanoyl group, a pivaloyl group, a hexanoyl group, a heptanoyl group, and the like, which are selected within the range of the individual specified number of carbon atoms.

The notation "($C_{a-b}$ haloalkyl)carbonyl" herein is a haloalkyl-C(O)— group as defined above having a carbon atom number of a to b. Specific examples of the ($C_{a-b}$ haloalkyl)carbonyl may include a fluoroacetyl group, a chloroacetyl group, a difluoroacetyl group, a dichloroacetyl group, a trifluoroacetyl group, a chlorodifluoroacetyl group, a bromodifluoroacetyl group, a trichloroacetyl group, a pentafluoropropionyl group, a heptafluorobutanoyl group, a 3-chloro-2,2-dimethylpropanoyl group, and the like, which are selected within the range of the individual specified number of carbon atoms.

The notation "($C_{a-b}$ alkoxy)carbonyl" herein is an alkyl-O—C(O)— group as defined above having a carbon atom number of a to b. Specific examples of the ($C_{a-b}$ alkoxy)carbonyl may include a methoxycarbonyl group, an ethoxycarbonyl group, an n-propyloxycarbonyl group, an i-propyloxycarbonyl group, an n-butoxycarbonyl group, an i-butoxycarbonyl group, a t-butoxycarbonyl group, and the like, which are selected within the range of the individual specified number of carbon atoms.

The notation "(C haloalkoxy)carbonyl" herein is a haloalkyl-O—C(O)— group as defined above having a carbon atom number of a to b. Specific examples of the ($C_{a-b}$ haloalkoxy)carbonyl may include a 2-chloroethoxycarbonyl group, a 2,2-difluoroethoxycarbonyl group, a 2,2,2-trifluoroethoxycarbonyl group, a 2,2,2-trichloroethoxycarbonyl group, and the like, which are selected within the range of the individual specified number of carbon atoms.

The notation "($C_{a-b}$ alkyl)aminocarbonyl" herein is a carbamoyl group in which one hydrogen atom is substituted with an alkyl group as defined above having a carbon atom number of a to b. Specific examples of the ($C_{a-b}$ alkyl)aminocarbonyl may include a methylcarbamoyl group, an ethylcarbamoyl group, an n-propylcarbamoyl group, an i-propylcarbamoyl group, an n-butylcarbamoyl group, an i-butylcarbamoyl group, an s-butylcarbamoyl group, a t-butylcarbamoyl group, and the like, which are selected within the range of the individual specified number of carbon atoms.

The notation "($C_{a-b}$ haloalkyl)aminocarbonyl" herein is a carbamoyl group in which one hydrogen atom is substituted with a haloalkyl group as defined above having a carbon atom number of a to b. Specific examples of the ($C_{a-b}$ haloalkyl)aminocarbonyl may include a 2-fluoroethylcarbamoyl group, a 2-chloroethylcarbamoyl group, a 2,2-difluoroethylcarbamoyl group, a 2,2,2-trifluoroethylcarbamoyl group, and the like, which are selected within the range of the individual specified number of carbon atoms.

The notation "di($C_{a-b}$ alkyl)aminocarbonyl" herein is a carbamoyl group in which both hydrogen atoms are substituted with alkyl groups as defined above, which have a carbon atom number of a to b and may be identical to or different from each other. Specific examples of the di($C_{a-b}$ alkyl)aminocarbonyl may include an N, N-dimethylcarbamoyl group, an N-ethyl-N-methylcarbamoyl group, an N, N-diethylcarbamoyl group, an N,N-di-n-propylcarbamoyl group, an N, N-di-n-butylcarbamoyl group, and the like, which are selected within the range of the individual specified number of carbon atoms.

The substituents $R^1$, $R^2$, $R^1$, $R^4$ and $R^5$ in a cinnamic acid- or benzoic acid-derivative having the structure of Formula (2) are preferably substituents, each independently selected from a hydrogen atom, a halogen atom, $C_{1-6}$ alkyl, $C_{1-6}$ haloalkyl, $C_{1-6}$ alkoxy, $C_{1-6}$ haloalkoxy, cyano, and nitro, among others.

In terms of alignment sensitivity, it is preferable for $R^3$ to be a substituent, other than a hydrogen atom, among the above preferred definitions of $R^1$, $R^2$, $R^3$, $R^4$ and $R^5$, and more preferably a substituent selected from a halogen atom, $C_{1-6}$ alkyl, $C_{1-6}$ haloalkyl, $C_{1-6}$ alkoxy, $C_{1-6}$ haloalkoxy, cyano, and nitro.

Any one or two substituent(s) among $R^1$, $R^2$, $R^3$, $R^4$ and $R^5$ is/are also preferably a group of Formula (3), and among these, it is preferable for $R^3$ to be a group of Formula (3). An example of such a monomer may include a monomer which has a cinnamic acid and is obtained from Formulae M1-1 to M1-7 and M1-17 to M1-20 above. An example of a monomer having a benzoic acid may include a monomer obtained from Formulae M2-1 to M2-9 above.

Examples of such a cinnamic acid and a derivative thereof may include a cinnamic acid derivative such as a cinnamic acid, a 4-methoxycinnamic acid, a 4-ethoxycinnamic acid, a 4-propoxycinnamic acid, or a 4-fluorocinnamic acid; and a cinnamic acid group-containing monomer, such as a 4-(6-methacryloxyhexyl-1-oxy) cinnamic acid, a 4-(6-acryloxyhexyl-1-oxy) cinnamic acid, a 4-(3-methacryloxypropyl-1-oxy) cinnamic acid, or a 4-(4-(6-methacryloxyhexyl-1-oxy) benzoyloxy) cinnamic acid, etc.

Examples of such a benzoic acid and a derivative thereof may include a benzoic acid derivative such as a benzoic acid, a 4-methoxybenzoic acid, a 4-ethoxybenzoic acid, a 4-propoxybenzoic acid, or a 4-fluorobenzoic acid; and a benzoic acid group-containing monomer, such as a 4-(6-methacryloxyhexyl-1-oxy) benzoic acid, a 4-(6-acryloxyhexyl-1-oxy) benzoic acid, a 4-(3-methacryloxypropyl-1-oxy) benzoic acid, or a 4-(4-(6-methacryloxyhexyl-1-oxy) benzoyloxy) benzoic acid, etc.

The content of component (B) in the liquid crystal alignment agent for photo-alignment according to the present invention is preferably 3-100 parts by mass with respect to 100 parts by mass of the resin of component (A). When the content of component (B) is 3 parts by mass or less, no improvement in irradiation amount margin is observed. When the content of component (B) exceeds 100 parts by mass, the solvent resistance of the obtained cured film may be reduced in some cases.

<Solvent>

The liquid crystal alignment agent for photo-alignment according to the present invention is mostly used in a solution state, that is, dissolved in a solvent. The type and structure of the solvent used are not particularly limited, provided the solvent is capable of dissolving component (A), component (B), and if desired, other additives described below.

Specific examples of the solvent may include methanol, ethanol, n-propanol, isopropanol, n-butanol, isobutanol, n-pentanol, 2-methyl-1-butanol, ethylene glycol monomethyl ether, ethylene glycol monoethyl ether, methyl cellosolve acetate, ethyl cellosolve acetate, diethylene glycol monomethyl ether, diethylene glycol monoethyl ether, propylene glycol, diethylene glycol, propylene glycol monomethyl ether, propylene glycol monomethyl ether acetate, propylene glycol monoethyl ether, propylene glycol propyl ether, propylene glycol propyl ether acetate, toluene, xylene, methyl ethyl ketone, cyclopentanone, cyclohexanone, 2-butanone, methyl isobutyl ketone, 3-methyl-2-pentanone, 2-pentanone, 2-heptanone, γ-butyrolactone, ethyl 2-hydroxypropionate, ethyl 2-hydroxy-2-methylpropionate, ethyl ethoxyacetate, ethyl hydroxyacetate, methyl 2-hydroxy-3-methylbutanoate, methyl 3-methoxypropionate, ethyl 3-methoxypropionate, ethyl 3-ethoxypropionate, methyl 3-ethoxypropionate, methyl pyruvate, ethyl pyruvate, ethyl acetate, butyl acetate, ethyl lactate, butyl lactate, cyclopentyl methyl ether, N,N-dimethylformamide, N,N-dimethyl acetamide, N-methyl pyrrolidone, and the like.

When the liquid crystal alignment agent for photo-alignment according to the present invention is used to prepare an aligning member by forming a cured film on a film, methanol, ethanol, isopropanol, n-propanol, n-butanol, 2-methyl-1-butanol, 2-heptanone, methyl isobutyl ketone, propylene glycol monomethyl ether, propylene glycol, diethylene glycol, propylene glycol monomethyl ether acetate, and the like are preferable due to being solvents to which the film exhibits resistance.

These solvents may be used alone, or in combinations of two or more.

<Other Additives>

The liquid crystal alignment agent for photo-alignment according to the present invention may contain, as needed, a sensitizer, an adhesion promoter, a silane coupling agent, a surfactant, a rheology modifier, a pigment, a dye, a storage stabilizer, an antifoaming agent, an antioxidant, and the like, provided the effect of the present invention is not impaired.

For example, the sensitizer is effective in promoting a photoreaction after the formation of a cured film using the liquid crystal alignment agent for photo-alignment according to the present invention.

Examples of the sensitizer, which is an example of the other additives, may include benzophenone, anthracene, anthraquinone, thioxanthone and the like and derivatives thereof, and nitrophenyl compounds, etc. Among these, benzophenone derivatives and nitrophenyl compounds are preferred. Specific examples of preferred compounds may include N,N-diethylaminobenzophenone, 2-nitrofluorene, 2-nitrofluorenone, 5-nitroacenaphthene, 4-nitrobiphenyl, 4-nitrocinnamic acid, 4-nitrostilbene, 4-nitrobenzophenone, 5-nitroindole, and the like. In particular, N,N-diethylaminobenzophenone, which is a derivative of benzophenone, is preferred.

These sensitizers are not limited to those described above. The sensitizer may be used alone, or by combining two or more compounds.

The content of the sensitizer used in the liquid crystal alignment agent for photo-alignment according to the present invention is preferably 0.1-20 parts by mass, and more preferably 0.2-10 parts by mass, with respect to 100 parts by mass of the sum of component (A) and component (B). When the content is extremely low, the effectiveness as a sensitizer may be insufficient in some cases, whereas when the content is excessively high, transmittance may decrease and a coating film may become rough.

<Preparation of Liquid Crystal Alignment Agent for Photo-Alignment>

The liquid crystal alignment agent for photo-alignment according to the present invention contains a resin as component (A) and a cinnamic acid derivative as component (B). The liquid crystal alignment agent for photo-alignment according to the present invention may also contain other additives, provided the effect of the present invention is not impaired. Meanwhile, the liquid crystal alignment agent for photo-alignment according to the present invention is substantially free of thermal crosslinking systems.

Preferred examples of the liquid crystal alignment agent for photo-alignment according to the present invention are as follows.

[1]: A liquid crystal alignment agent for photo-alignment, the liquid crystal alignment agent containing component (A) and component (B), wherein the content of component (B) is 3-100 parts by mass with respect to 100 parts by mass of component (A).

[2]: A liquid crystal alignment agent for photo-alignment, wherein component (A) and component (B) are dissolved in a solvent.

[3]: A liquid crystal alignment agent for photo-alignment, wherein component (A) and component (B) are dissolved in a solvent, and the content of component (B) is 3-100 parts by mass with respect to 100 parts by mass of component (A).

[4]: A liquid crystal alignment agent for photo-alignment, wherein in addition to component (A) and component (B), at least one additive selected from a sensitizer, an adhesion promoter, a silane coupling agent, a surfactant, a rheology modifier, a pigment, a dye, a storage stabilizer, an antifoaming agent, and an antioxidant is dissolved in a solvent, and the content of component (B) is 3-100 parts by mass with respect to 100 parts by mass of component (A).

The mixing ratio, preparation method and the like in the case in which the liquid crystal alignment agent for photo-alignment according to the present invention is used in the form of a solution are described in detail below.

Although the proportion of solid content in the liquid crystal alignment agent for photo-alignment according to the present invention is not particularly limited, provided the respective components are homogeneously dissolved in the solvent, the proportion of solid content is 1-80 mass %, preferably 2-60 mass %, and more preferably 3-40 mass %. Solid content herein refers to components remaining after removing the solvent from all the components of the liquid crystal alignment agent for photo-alignment.

The method for preparing the liquid crystal alignment agent for photo-alignment according to the present invention is not particularly limited. For example, the preparation method may be a method in which a homogeneous solution is prepared by mixing component (B) in a predetermined proportion in a solution obtained by dissolving component (A) in a solvent, or a method in which, in an appropriate step of the preparation method, other additives are further added and mixed in as needed.

In the method for preparing the liquid crystal alignment agent for photo-alignment according to the present invention, a solution in which a specific copolymer obtained by a polymerization reaction is dissolved in a solvent may be used as-is. In this case, for example, component (B) is added, in the same manner as described above, to the solution of component (A) to obtain a homogeneous solution. A solvent may be further added to adjust the concentration of the liquid crystal alignment agent for photo-alignment. The solvent used in the step for producing component (A) and the solvent used to adjust the concentration of the liquid crystal alignment agent for photo-alignment may be identical to or different from each other.

The prepared solution of the liquid crystal alignment agent for photo-alignment is preferably used after being filtered using a filter having a pore diameter of about 0.2 μm.

<Cured Film, Aligning Member, and Retardation Member>

The solution of the liquid crystal alignment agent for photo-alignment according to the present invention may be applied onto a substrate (e.g., a substrate coated with silicon/silicon dioxide; a silicon nitride substrate; a substrate coated with a metal such as aluminum, molybdenum, or chromium; a glass substrate; a quartz substrate; or an ITO substrate, etc.), a film (e.g., a resin film such as a triacetylcellulose (TAC) film, a cycloolefin polymer film, a polyethylene terephthalate film, or an acrylic film), or the like, by bar coating, spin coating, flow coating, roll coating, slit coating, slit coating followed by spin coating, inkjet coating, printing, or the like to form a coating film, and then heat-dried, for example, on a hot plate or in an oven to thereby form a cured film.

The conditions for heat-drying should allow the solvent contained in the liquid crystal alignment agent for photo-alignment to completely or substantially evaporate, and for example, the heating temperature and heating time are appropriately selected in the range of 60° C. to 230° C. and 0.4 minutes to 60 minutes, respectively. The heating temperature and the heating time are preferably 70° C. to 230° C. and 0.5 minutes to 10 minutes, respectively.

The thickness of the cured film formed using the liquid crystal alignment agent for photo-alignment according to the present invention is, for example, 0.05 μm to 5 μm, and may be appropriately selected in consideration of the step height and the optical and electrical properties of the substrate used.

The cured film thus obtained may be irradiated with polarized UV, and thereby function as an aligning member, i.e., a member for aligning a compound having liquid crystallinity, such as a liquid crystal.

Ultraviolet-to-visible light having a wavelength of 150 nm to 450 nm is typically used for polarized UV irradiation, and the cured film is irradiated, at room temperature or in a heated state, with vertically or diagonally incident linearly polarized light.

Since the aligning member formed from the liquid crystal alignment agent for photo-alignment according to the present invention has solvent resistance and heat resistance, a retardation material composed of a polymerizable liquid crystal solution is applied onto the aligning member and then heated to the phase transition temperature of the liquid crystal so that the retardation material is aligned in a liquid crystal state on the aligning member. Then, the aligned retardation material may be cured as-is to form a retardation member as a layer having optical anisotropy.

For example, a liquid crystal monomer having a polymerizable group, a composition containing the liquid crystal monomer, and the like are used as a retardation material. When the substrate on which the aligning member is formed is a film, the film having the retardation member of the present embodiment is useful as a retardation film. Retardation materials for forming such a retardation member include those that become a liquid crystal state to form, on the aligning member, alignment states, such as horizontal alignment, cholesteric alignment, vertical alignment, and hybrid alignment, and can each be used according to the required retardation.

When manufacturing a patterned retardation member used in a 3D display, the cured film formed by the aforementioned method from the liquid crystal alignment agent for photo-alignment according to the present embodiment is exposed, from a predetermined reference via a line-and-space pattern mask, to polarized UV in the +45 degree direction, and after removing the mask, is exposed to polarized UV in the −45 degree direction to obtain an aligning member in which two types of liquid crystal alignment regions having different liquid crystal alignment control directions are formed. Subsequently, a retardation material composed of a polymerizable liquid crystal solution is applied onto the aligning member and then heated to the phase transition temperature of the liquid crystal so that the retardation material is aligned in a liquid crystal state on the aligning member. Then, the aligned retardation material may be cured as-is to obtain a patterned retardation member in which two types of retardation regions having different retardation characteristics are regularly arranged each in plurality.

After two substrates having the respective aligning members of the present invention formed as described above are laminated such that the respective aligning members on the two substrates face each other with a spacer disposed therebetween, liquid crystals may be injected between these substrates to form a liquid crystal display device in which the liquid crystals are aligned.

Therefore, the liquid crystal alignment agent for photo-alignment according to the present invention can be suitably used for manufacturing various retardation members (retardation films), liquid crystal display devices, and the like.

EXAMPLES

Hereinafter, the present embodiment will be described in more detail with reference to examples. However, the present invention is not limited to these examples.

[Components Used in Examples and their Abbreviations]

The components used in the following Examples and Comparative Examples are as follows.

<Monomer>

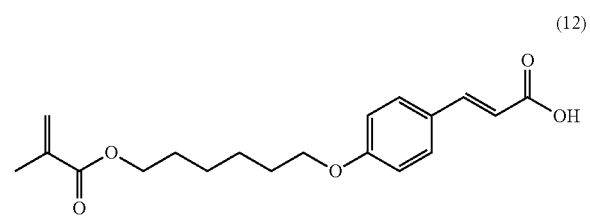

MA1: 4-(6-methacryloxyhexyl-1-oxy) cinnamic acid (12)

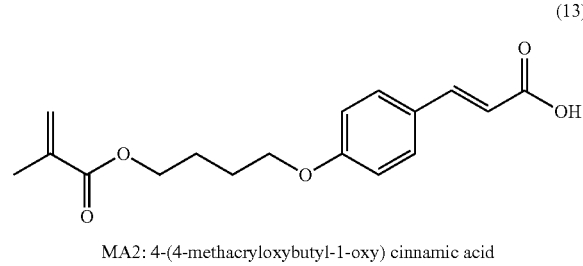

MA2: 4-(4-methacryloxybutyl-1-oxy) cinnamic acid (13)

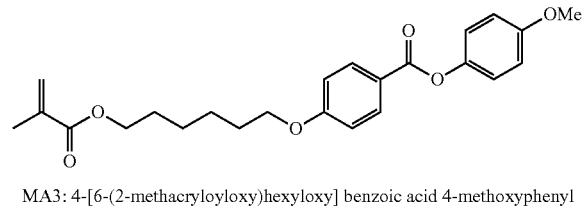

MA3: 4-[6-(2-methacryloyloxy)hexyloxy] benzoic acid 4-methoxyphenyl ester (14)

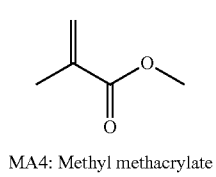

MA4: Methyl methacrylate (15)

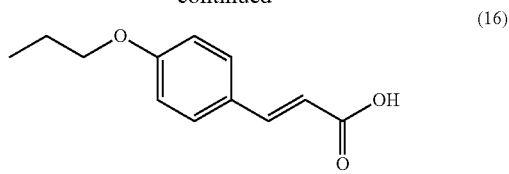

MA5: 4-propoxycinnamic acid (16)

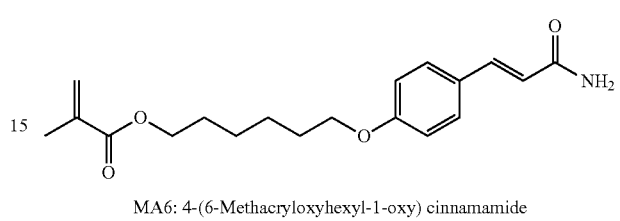

MA6: 4-(6-Methacryloxyhexyl-1-oxy) cinnamamide (17)

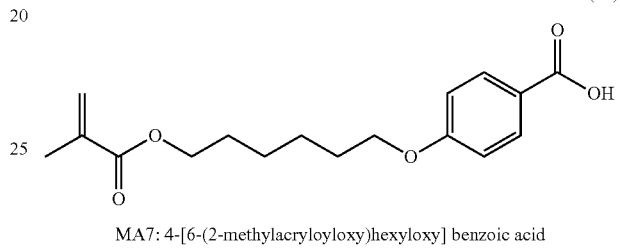

MA7: 4-[6-(2-methylacryloyloxy)hexyloxy] benzoic acid (18)

<Solvent>

Liquid crystal alignment agents for photo-alignment in Examples and Comparative Examples contain a solvent, and propylene glycol monomethyl ether (PM) and cyclohexanone (CYH) were used as the solvent.

<Measurement of Molecular Weight of Polymer>

The molecular weights of acrylic copolymers in Polymerization Examples were measured using a room temperature gel permeation chromatography (GPC) apparatus (GPC-101) manufactured by Shodex Co., Ltd., and columns (KD-803 and KD-805) manufactured by Shodex Co., Ltd.

The following number average molecular weights (hereinafter referred to as Mn) and weight average molecular weights (hereinafter referred to as Mw) were expressed as polystyrene equivalent values.

Column temperature: 50° C.

Eluent: N,N-dimethylformamide (containing, as additives, 30 mmol/L of lithium bromide hydrate (LiBr.H$_2$O), 30 mmol/L of phosphoric acid anhydrous crystal (o-phosphoric acid), and 10 mL/L of tetrahydrofuran (THF))

Flow rate: 1.0 mL/min

Standard sample for creating calibration curve: TSK standard polyethylene oxide (having a molecular weight of about 900,000, 150,000, 100,000, and 30,000) produced by TOSOH CORP., and polyethylene glycol (having a molecular weight of about 12,000, 4,000, and 1,000) produced by Polymer Laboratory Co.

<Polymerization Example 1> MA1 Homo (M6CA Homo)

15.0 g of MA1 and 0.7 g of α,α'-azobisisobutyronitrile as a polymerization catalyst were dissolved in 141.7 g of 1,4-dioxane, and reacted for 20 hours at 80° C. to obtain an acrylic copolymer solution (solid content concentration: 10 mass %). The acrylic copolymer solution was gradually added dropwise to 1000.0 g of diethyl ether to precipitate a solid, and remaining monomers were removed by filtration and drying under reduced pressure to obtain an acrylic copolymer (P1). The acrylic copolymer thus obtained had a Mn of 6,700 and a Mw of 21,000.

<Polymerization Example 2> MA2 (M4CA Homo)

4.0 g of MA2 and 0.1 g of α,α'-azobisisobutyronitrile as a polymerization catalyst were dissolved in 36.9 g of 1,4-dioxane, and reacted for 20 hours at 80° C. to obtain an acrylic copolymer solution (solid content concentration: 10 mass %). The acrylic copolymer solution was gradually added dropwise to 500.0 g of diethyl ether to precipitate a solid, and remaining monomers were removed by filtration and drying under reduced pressure to obtain an acrylic copolymer (P2). The acrylic copolymer thus obtained had a Mn of 9,700 and a Mw of 24,000.

<Polymerization Example 3> MA1-MA3 9-1 (M6CA-6MBE)

8.0 g of MA1, 1.1 g of MA3, and 0.2 g of α,α'-azobisisobutyronitrile as a polymerization catalyst were dissolved in 99.4 g of 1,4-dioxane, and reacted for 20 hours at 80° C. to obtain an acrylic copolymer solution (solid content concentration: 10 mass %). The acrylic copolymer solution was gradually added dropwise to 1000.0 g of diethyl ether to precipitate a solid, and remaining monomers were removed by filtration and drying under reduced pressure to obtain an acrylic copolymer (P3). The acrylic copolymer thus obtained had a Mn of 11,000 and a Mw of 21,000.

<Polymerization Example 4> MA1-MA3 7-3 (M6CA-6MBE)

6.0 g of MA1, 3.2 g of MA3, and 0.1 g of α,α'-azobisisobutyronitrile as a polymerization catalyst were dissolved in 99.2 g of 1,4-dioxane, and reacted for 20 hours at 80° C. to obtain an acrylic copolymer solution (solid content concentration: 10 mass %). The acrylic copolymer solution was gradually added dropwise to 1000.0 g of diethyl ether to precipitate a solid, and remaining monomers were removed by filtration and drying under reduced pressure to obtain an acrylic copolymer (P4). The acrylic copolymer thus obtained had a Mn of 14,000 and a Mw of 30,000.

<Polymerization Example 5> MA1-MA4 9-1 (M6CA-MMA)

6.0 g of MA1, 0.2 g of MA4, and 0.2 g of α,α'-azobisisobutyronitrile as a polymerization catalyst were dissolved in 57.2 g of 1,4-dioxane, and reacted for 20 hours at 80° C. to obtain an acrylic copolymer solution (solid content concentration: 10 mass %). The acrylic copolymer solution was gradually added dropwise to 500.0 g of diethyl ether to precipitate a solid, and remaining monomers were removed by filtration and drying under reduced pressure to obtain an acrylic copolymer (P5). The acrylic copolymer thus obtained had a Mn of 20,000 and a Mw of 40,000.

<Examples 1-11> and <Comparative Examples 1-5>

Liquid crystal alignment agents for photo-alignment in Examples 1-11 and Comparative Examples 1-5 were prepared using the compositions shown in Table 1. Then, cured films were formed using the liquid crystal alignment agents for photo-alignment, and the alignment properties of the obtained cured films were evaluated.

TABLE 1

|  | Component (A) Types Mixing amount (Parts by mass) | Component (B) Types Mixing amount (Parts by mass) | Solvent Types | Solid content concentration (mass %) |
|---|---|---|---|---|
| Example 1 | P1 100 | MA1 30 | PM/CYH 70/30 | 5 |
| Example 2 | P1 100 | MA5 30 | PM/CYH 70/30 | 5 |
| Example 3 | P1 100 | MA6 30 | PM/CYH 70/30 | 5 |
| Example 4 | P1 100 | MA7 30 | PM/CYH 70/30 | 5 |
| Comparative Example 1 | P1 100 |  | PM/CYH 70/30 | 5 |
| Example 5 | P2 100 | MA1 30 | PM/CYH 70/30 | 5 |
| Comparative Example 2 | P2 100 |  | PM/CYH 70/30 | 5 |
| Example 6 | P3 100 | MA1 10 | PM/CYH 70/30 | 5 |
| Example 7 | P3 100 | MA1 20 | PM/CYH 70/30 | 5 |
| Example 8 | P3 100 | MA1 30 | PM/CYH 70/30 | 5 |
| Example 9 | P3 100 | MA1 40 | PM/CYH 70/30 | 5 |
| Comparative Example 3 | P3 100 |  | PM/CYH 70/30 | 5 |
| Example 10 | P4 100 | MA1 30 | PM/CYH 70/30 | 5 |
| Comparative Example 4 | P4 100 |  | PM/CYH 70/30 | 5 |
| Example 11 | P5 100 | MA1 30 | PM/CYH 70/30 | 5 |
| Comparative Example 5 | P5 100 |  | PM/CYH 70/30 | 5 |

[Evaluation of Alignment Properties]

The liquid crystal alignment agents for photo-alignment in Examples and Comparative Examples were applied onto respective TAC films using a bar coater, and then heated and dried at a temperature of 110° C. for 1 minute in a heat circulating oven to form cured films. Each of the cured films was vertically irradiated with linearly polarized light having a wavelength of 313 nm at an exposure dose of 25 mJ/cm$^2$, 50 mJ/cm$^2$, or 100 mJ/cm$^2$ to form an aligning member. RMS 14-048C, which is a polymerizable liquid crystal solution for horizontal alignment and manufactured by Merck KGaA Co., Ltd., was applied onto the aligning member on the TAC film by using a bar coater, and pre-baked on a hot plate at 65° C. for 60 seconds to form a coating film. This coating film was exposed to light at 300 mJ/cm$^2$ to prepare a retardation member. The prepared retardation member was sandwiched between a pair of polarizing plates, and the expression of retardation characteristics in the retardation member was observed. Those in which defect-free retardation was expressed were marked ○, those in which defective retardation was expressed were marked Δ, and those in which retardation was not expressed were marked x in the column labeled "alignment properties".

[Evaluation Results]

The results of the above evaluation are shown in Table 2.

TABLE 2

| | Alignment properties | | |
|---|---|---|---|
| | 25 mJ | 50 mJ | 100 mJ |
| Example 1 | ○ | ○ | Δ |
| Example 2 | ○ | ○ | ○ |
| Example 3 | ○ | ○ | Δ |
| Example 4 | ○ | ○ | Δ |
| Comparative Example 1 | ○ | Δ | x |
| Example 5 | ○ | Δ | x |
| Comparative Example 2 | Δ | x | x |
| Example 6 | ○ | ○ | Δ |
| Example 7 | ○ | ○ | ○ |
| Example 8 | ○ | ○ | ○ |
| Example 9 | ○ | ○ | ○ |
| Comparative Example 3 | ○ | Δ | x |
| Example 10 | ○ | ○ | ○ |
| Comparative Example 4 | Δ | Δ | Δ |
| Example 11 | ○ | ○ | ○ |
| Comparative Example 5 | ○ | Δ | x |

In Comparative Example 1 in which no monomer was mixed, it was possible to form a suitable retardation member at an exposure dose of 25 mJ/cm$^2$; however, at high exposure doses of 50 mJ/cm$^2$ and 100 mJ/cm$^2$, retardation was either expressed defectively or not at all, and thus suitable retardation members could not be obtained. On the other hand, in Examples 1 to 4 in which monomers were mixed, it was possible to form suitable retardation members at high exposure doses.

In Comparative Example 2 in which no monomer was mixed, retardation was either expressed defectively or not at all at exposure doses of 25 mJ/cm$^2$, 50 mJ/cm$^2$, and 100 mJ/cm$^2$, and thus suitable retardation members could not be obtained. On the other hand, in Example 5 in which a monomer was mixed, it was possible to form a suitable retardation member at an exposure dose of 25 mJ/cm$^2$.

In Comparative Example 3 in which no monomer was mixed, it was possible to form a suitable retardation member at an exposure dose of 25 mJ/cm$^2$; however, at high exposure doses of 50 mJ/cm$^2$ and 100 mJ/cm$^2$, retardation was either expressed defectively or not at all, and thus suitable retardation members could not be obtained. On the other hand, in Examples 6 to 9 in which monomers were mixed, it was possible to form suitable retardation members at high exposure doses.

In Comparative Example 4 in which no monomer was mixed, retardation was either expressed defectively or not at all at exposure doses of 25 mJ/cm$^2$, 50 mJ/cm$^2$, and 100 mJ/cm$^2$, and thus suitable retardation members could not be obtained. On the other hand, in Example 10 in which a monomer was mixed, it was possible to form suitable retardation members at exposure doses of 25 mJ/cm$^2$, 50 mJ/cm$^2$, and 100 mJ/cm$^2$.

In Comparative Example 5 in which no monomer was mixed, it was possible to form a suitable retardation member at an exposure dose of 25 mJ/cm$^2$; however, at high exposure doses of 50 mJ/cm$^2$ and 100 mJ/cm$^2$, retardation was either expressed defectively or not at all, and thus suitable retardation members could not be obtained. On the other hand, in Examples 11 in which a monomer was mixed, it was possible to form suitable retardation members at high exposure doses.

INDUSTRIAL APPLICABILITY

The liquid crystal alignment agent for photo-alignment of the present invention is very useful for an aligning member for forming a liquid crystal alignment film of a liquid crystal display device, or an optically anisotropic film provided inside or outside the liquid crystal display device, and is particularly suitable as a material for forming a patterned retardation member of a 3D display. Furthermore, the liquid crystal alignment agent for photo-alignment of the present invention is suitable as a material for forming a cured film, such as a protective film, a flat film and an insulating film in various types of displays such as a thin film transistor (TFT)-type liquid crystal display device or an organic EL device, and is particularly suitable as a material for forming an interlayer insulating film of a TFT type liquid crystal display device, a protective film of a color filter, an insulating film of an organic EL device, or the like.

The invention claimed is:

1. A liquid crystal alignment agent for photo-alignment, the liquid crystal alignment agent containing (A) a resin having a side chain including a structure of Formula (1) below, and (B) a compound of Formula (2) below,

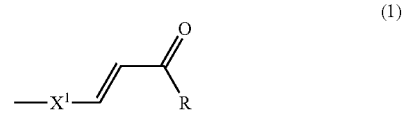
(1)

in Formula (1), $X^1$ is a benzene ring which may be substituted with a substituent, wherein the substituent is one or more of an alkyl group, a haloalkyl group, an alkoxy group, a halogen atom, a cyano group and a nitro group, and R is a substituent selected from OH and $NH_2$;

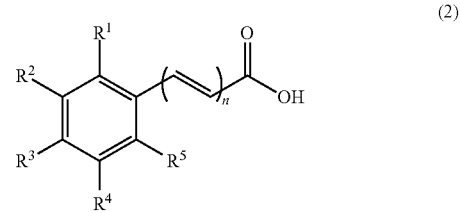
(2)

in Formula (2), any 3-5 of $R^1$, $R^2$, $R^3$, $R^4$ and $R^5$ are each independently a substituent selected from a hydrogen atom, a halogen atom, $C_{1-6}$ alkyl, $C_{1-6}$ haloalkyl, $C_{3-8}$ cycloalkyl, $C_{3-8}$ halocycloalkyl, $C_{2-6}$ alkenyl, $C_{2-6}$ haloalkenyl, $C_{3-8}$ cycloalkenyl, $C_{3-8}$ halocycloalkenyl, $C_{2-6}$ alkynyl, $C_{2-6}$ haloalkynyl, $C_{1-6}$ alkoxy, $C_{1-6}$ haloalkoxy, ($C_{1-6}$ alkyl)carbonyl, ($C_{1-6}$ haloalkyl)carbonyl, ($C_{1-6}$ alkoxy)carbonyl, ($C_{1-6}$ haloalkoxy)carbonyl, ($C_{1-6}$ alkyl)aminocarbonyl, ($C_{1-6}$ haloalkyl)aminocarbonyl, di($C_{1-6}$ alkyl)aminocarbonyl, cyano and nitro, and when any 3 or 4 of $R^1$, $R^2$, $R^3$, $R^4$ and $R^5$ are as defined above, the remaining one or two of $R^1$, $R^2$, $R^3$, $R^4$ and $R^5$ is/are a group of Formula (3) below,

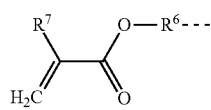

(3)

in Formula (3), the dashed line is a bond, $R^6$ is $C_{1-30}$ alkylene, phenylene, or a divalent carbocyclic ring or heterocyclic ring, one or a plurality of hydrogen atoms of the alkylene, phenylene, or divalent carbocyclic ring or heterocyclic ring is optionally substituted with a fluorine atom, and when $R^6$ is $C_{1-3}$ alkylene, —CH$_2$CH$_2$— of $R^6$ is optionally replaced by —CH=CH—, —CH$_2$— of $R^6$ is optionally replaced by phenylene or a divalent carbocyclic ring or heterocyclic ring, and is optionally replaced by —O—, —NHCO—, —CONH—, —COO—, —OCO—, —NH—, —NHCONH—, or —CO—, provided these groups are not adjacent to each other, and $R^7$ is a hydrogen atom or a methyl group, and n is an integer of 0 or 1.

2. The liquid crystal alignment agent for photo-alignment according to claim 1, wherein the resin of component (A) is an acrylic copolymer.

3. The liquid crystal alignment agent for photo-alignment according to claim 1, wherein the R in Formula (1) is OH.

4. The liquid crystal alignment agent for photo-alignment according to claim 1 wherein the content of component (B) is 3-100 parts by mass with respect to 100 parts by mass of component (A).

5. An aligning member prepared by using the liquid crystal alignment agent for photo-alignment according to claim 1.

6. A retardation member formed by using the aligning member according to claim 5.

* * * * *